United States Patent
Kim et al.

(10) Patent No.: US 11,892,076 B2
(45) Date of Patent: Feb. 6, 2024

(54) METHOD FOR TRANSMITTING SHIFT SIGNAL OF ELECTRONIC SHIFT SYSTEM

(71) Applicants: Hyundai Motor Company, Seoul (KR); Kia Corporation, Seoul (KR)

(72) Inventors: Bum Jun Kim, Bucheon-si (KR); Yong Ik Kim, Hanam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/086,283

(22) Filed: Dec. 21, 2022

(65) Prior Publication Data

US 2023/0117371 A1    Apr. 20, 2023

Related U.S. Application Data

(62) Division of application No. 17/126,398, filed on Dec. 18, 2020, now abandoned, which is a division of
(Continued)

(30) Foreign Application Priority Data

Jun. 29, 2018    (KR) .......... 10-2018-0075211

(51) Int. Cl.
*F16H 61/18* (2006.01)
*F16H 61/02* (2006.01)
(Continued)

(52) U.S. Cl.
CPC ....... *F16H 61/0213* (2013.01); *B60W 10/115* (2013.01); *F16H 59/105* (2013.01); *F16H 59/12* (2013.01); *F16H 61/18* (2013.01); *F16H 61/0248* (2013.01); *F16H 61/16* (2013.01); *F16H 61/30* (2013.01); *F16H 2059/081* (2013.01)

(58) Field of Classification Search
CPC .... F16H 61/0213; F16H 59/105; F16H 59/12; F16H 61/18; F16H 61/0248; F16H 61/16; F16H 2059/081; F16H 59/08
USPC ................................ 701/62, 64, 66; 74/335
See application file for complete search history.

(56) References Cited

U.S. PATENT DOCUMENTS

| | | |
|---|---|---|
| 4,610,179 A | 9/1986 | Parker |
| 4,987,792 A | 1/1991 | Mueller |

(Continued)

FOREIGN PATENT DOCUMENTS

| | | |
|---|---|---|
| CN | 101809333 A | 8/2010 |
| CN | 106573537 | 4/2017 |

(Continued)

OTHER PUBLICATIONS

English translation of JP2003028292A; http://translationportal.epo.org; Jul. 12, 2023 (Year: 2023).*

*Primary Examiner* — Roger L Pang
(74) *Attorney, Agent, or Firm* — MORGAN, LEWIS & BOCKIUS LLP

(57) ABSTRACT

A method for transmitting a shift signal of an electronic shift system, may include transmitting the shift signal generated at the time of operating a shift operation device, wherein the shift operation device is configured so that one shift stage and one shift signal are matched one to one and transmits shift signals which are each individually separated according to the shift stage.

5 Claims, 5 Drawing Sheets

| THIRD EMBODIMENT | BUTTON TYPE | DIAL TYPE AND LEVER TYPE (RELATED ART) | DIAL TYPE AND LEVER TYPE (PRESENT DISCLOSURE) | CONCLUSION | UNIFIED TYPE |
|---|---|---|---|---|---|
| TRANSMISSION TIME OF SHIFT SIGNAL | ON/OFF R SIGNAL<br><br>MAINTAIN ON STATE WHEN PUSHING BUTTON AND MAINTAIN OFF STATE WHEN NOT PUSHING BUTTON | ON/OFF R SIGNAL<br><br>CONTINUOUSLY TRANSMIT THE SAME SIGNAL UNTIL SHIFT OF ANOTHER STAGE IS REQUESTED DUE TO CONTINUOUSLY CONNECTED SHIFT SIGNAL | ON/OFF R SIGNAL<br><br>FORCIBLY STOP SHIFT SIGNAL TRANSMITTED AFTER PREDETERMINED TIME ELAPSES AFTER SHIFT SIGNAL IS TRANSMITTED | UNIFY THE DIAL TYPE AND THE LEVER TYPE INTO BUTTON TYPE | UNIFY MODE OF TRANSMITTING SHIFT SIGNAL |

Related U.S. Application Data application No. 16/172,446, filed on Oct. 26, 2018, now abandoned.

(51) Int. Cl.

| | | |
|---|---|---|
| *B60W 10/115* | (2012.01) | |
| *F16H 59/12* | (2006.01) | |
| *F16H 59/10* | (2006.01) | |
| F16H 61/30 | (2006.01) | |
| F16H 59/08 | (2006.01) | |
| F16H 61/16 | (2006.01) | |

(56) References Cited

U.S. PATENT DOCUMENTS

| | | | |
|---|---|---|---|
| 5,009,128 A | 4/1991 | Seidel | |
| 5,161,422 A | 11/1992 | Suman | |
| 5,307,013 A | 4/1994 | Santos | |
| 5,726,889 A | 3/1998 | Shinojima | |
| 5,767,769 A | 6/1998 | Issa | |
| 7,001,308 B2 | 2/2006 | Heneken | |
| 7,963,882 B2 | 6/2011 | Nishimura | |
| 9,845,868 B2 | 12/2017 | Lee et al. | |
| 2002/0087246 A1* | 7/2002 | Kim | F16H 61/16 701/55 |
| 2006/0258503 A1 | 1/2006 | Inoue | |
| 2015/0369357 A1 | 12/2015 | Lee et al. | |
| 2016/0017983 A1 | 1/2016 | Levesque et al. | |
| 2017/0138464 A1* | 5/2017 | Shine | F16H 59/105 |
| 2017/0248227 A1 | 8/2017 | Zhao | |
| 2017/0307069 A1 | 10/2017 | Riera | |
| 2018/0259063 A1 | 9/2018 | Wang et al. | |
| 2019/0093758 A1 | 3/2019 | Kelly | |

FOREIGN PATENT DOCUMENTS

| | | |
|---|---|---|
| CN | 106907474 A | 6/2017 |
| CN | 107023665 A | 8/2017 |
| CN | 105393027 | 3/2019 |
| JP | H10-047473 | 2/1998 |
| JP | H116559 A | 1/1999 |
| JP | 2001-124197 A | 5/2001 |
| JP | 2003-028292 | 1/2003 |
| JP | 2012101578 A | 5/2012 |
| JP | 6083230 B2 | 2/2017 |
| KR | 10-2007-0005054 A | 1/2007 |
| KR | 10-1438307 | 9/2014 |
| KR | 10-2019-0134927 A | 12/2019 |
| WO | WO2013/183513 | 12/2013 |

* cited by examiner

FIG. 3

| FIRST EMBODIMENT | BUTTON TYPE | DIAL TYPE AND LEVER TYPE (RELATED ART) | DIAL TYPE AND LEVEL TYPE (PRESENT DISCLOSURE) | | CONCLUSION | UNIFIED TYPE |
|---|---|---|---|---|---|---|
| SHIFT SIGNAL | <table><tr><th>SIGNAL</th><th>SHIFT SIGNAL</th></tr><tr><td>P</td><td>TRANSMIT INDIVIDUAL SHIFT SIGNAL(ON/OFF)</td></tr><tr><td>R</td><td>TRANSMIT INDIVIDUAL SHIFT SIGNAL(ON/OFF)</td></tr><tr><td>N</td><td>TRANSMIT INDIVIDUAL SHIFT SIGNAL(ON/OFF)</td></tr><tr><td>D</td><td>TRANSMIT INDIVIDUAL SHIFT SIGNAL(ON/OFF)</td></tr></table><br>TRANSMIT INDIVIDUAL SHIFT SIGNAL SEPARATED FOR EACH OF SHIFT STAGES | SHIFT SIGNAL step plot (R, Nr, Nd, D vs Time)<br><br>TRANSMIT CONTINUOUSLY CONNECTED ONE SHIFT SIGNAL | <table><tr><th>SIGNAL</th><th>SHIFT SIGNAL</th></tr><tr><td>P BUTTON</td><td>TRANSMIT INDIVIDUAL SHIFT SIGNAL (ON/OFF)</td></tr><tr><td>R POSITION</td><td>TRANSMIT INDIVIDUAL SHIFT SIGNAL (ON/OFF)</td></tr><tr><td>Nr POSITION</td><td>TRANSMIT INDIVIDUAL SHIFT SIGNAL (ON/OFF)</td></tr><tr><td>Nd POSITION</td><td>TRANSMIT INDIVIDUAL SHIFT SIGNAL (ON/OFF)</td></tr><tr><td>D POSITION</td><td>TRANSMIT INDIVIDUAL SHIFT SIGNAL (ON/OFF)</td></tr></table> | | UNIFY THE DIAL TYPE AND THE LEVER TYPE INTO BUTTON TYPE (TRANSMIT ONLY SIGNAL OF SELECTED ONE SHIFT STAGE (ON) AND NOT TRANSMIT SIGNALS OF REMAINING SHIFT STAGES (OFF)) | UNIFY MODE OF TRANSMITTING SHIFT SIGNAL |

FIG. 4

| SECOND EMBODIMENT | BUTTON TYPE (RELATED ART) | DIAL TYPE AND LEVER TYPE (RELATED ART) | DIAL TYPE AND LEVER TYPE (PRESENT DISCLOSURE) | UNIFIED TYPE |
|---|---|---|---|---|
| WHEN TWO OR MORE SHIFT SIGNALS OCCUR WITHIN PREDETERMINED TIME | ACCEPT ONLY PRECEDING SIGNAL AND REJECT THE REMAINING FOLLOWING SIGNALS | ACCEPT ONLY PRECEDING SIGNAL AND REJECT THE REMAINING FOLLOWING SIGNALS | ACCEPT ONLY ONE SHIFT SIGNAL TRANSMITTED LAST AND REJECT THE REMAINING PRECEDING SHIFT SIGNALS | UNIFY MODE OF TRANSMITTING SHIFT SIGNAL |

FIG. 5

| THIRD EMBODIMENT | BUTTON TYPE | DIAL TYPE AND LEVER TYPE (RELATED ART) | DIAL TYPE AND LEVER TYPE (PRESENT DISCLOSURE) | CONCLUSION | UNIFIED TYPE |
|---|---|---|---|---|---|
| TRANSMISSION TIME OF SHIFT SIGNAL | ON/OFF R SIGNAL — MAINTAIN ON STATE WHEN PUSHING BUTTON AND MAINTAIN OFF STATE WHEN NOT PUSHING BUTTON | ON R SIGNAL — CONTINUOUSLY TRANSMIT THE SAME SIGNAL UNTIL SHIFT OF ANOTHER STAGE IS REQUESTED DUE TO CONTINUOUSLY CONNECTED SHIFT SIGNAL | ON/OFF R SIGNAL — FORCIBLY STOP SHIFT SIGNAL TRANSMITTED AFTER PREDETERMINED TIME ELAPSES AFTER SHIFT SIGNAL IS TRANSMITTED | UNIFY THE DIAL TYPE AND THE LEVER TYPE INTO BUTTON TYPE | UNIFY MODE OF TRANSMITTING SHIFT SIGNAL |

METHOD FOR TRANSMITTING SHIFT SIGNAL OF ELECTRONIC SHIFT SYSTEM

CROSS REFERENCE TO RELATED APPLICATION

The present application is a Divisional of U.S. patent application Ser. No. 17/126,398, filed Dec. 18, 2020, which is a Divisional of U.S. patent application Ser. No. 16/172,446, filed Oct. 26, 2018, which claims priority to Korean Patent Application No. 10-2018-0075211, filed on Jun. 29, 2018, the entire contents of which is incorporated herein for all purposes by these references.

BACKGROUND OF THE INVENTION

Field of the Invention

The present invention relates to a method for transmitting a shift signal of an electronic shift system, and more particularly, to a technology for a method for transmitting a shift signal of an electronic shift system capable of commonly using a transmission control unit (TCU) by transmitting a unified shift signal regardless of a type of shift operation device (a button, a dial, and a lever).

Description of Related Art

In general, a vehicle in which an automatic transmission is mounted controls a hydraulic pressure in a shift range set according to a driving speed of the vehicle so that a shift gear of a target shift stage range may be operated automatically.

The automatic transmission generates a gear ratio by use of a hydraulic circuit, a planetary gear, and friction components to perform a shift and a transmission control unit (TCU) controls such components.

A shift by wire (hereinafter, referred to SBW) system, which is an electronic shift system for a vehicle, is an electronic shift system without having a mechanical connection structure such as a cable between a transmission and a shift lever unlike a conventional mechanical shift system, and is a system in which when a sensor value generated at the time of operating an electronic shift lever, button, or dial is transferred to the TCU, a solenoid or electric motor is operated by an electronic signal instructed by the TCU, and the hydraulic pressure is applied to or cut from the hydraulic circuit for each of the shifting stages by the operation of the solenoid or electric motor, electrically performing a shift control.

Therefore, the automatic transmission based on the SBW has an advantage that a shift operation to a drive D, reverse R, neutral N, and parking P range is more easily performed by transferring a driver's shift intension to the TCU through a simple operation of the electronic shift lever, button, or dial as the electrical signal, and also has an advantage that the shift lever may be miniaturized and a wide space between a driver's sheet and a passenger's sheet may be secured.

Examples of a method for performing a shift operation in the electronic shift system generally include a button type using a button, a dial type using a rotation of a dial, and a lever type using a lever.

The button type separately may include the button for each of the shifting stages P, R, N, and D to separately transmit a separated shift signal for each of the shifting stages, and the dial type and the lever type transmit the shift signal using one dial or lever and are configured to transmit a continuously connected one shift signal.

Therefore, since the conventional electronic shift system is a system of transmitting the shift signal according to a configuration using the button type and a configuration using the dial or the lever, it has a disadvantage in that the TCU receiving the shift signal should be dualized and developed. As a result, there is a drawback in that the investment cost is increased, and there is a disadvantage in that it is difficult to establish a database of the shift signal.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for transmitting a shift signal of an electronic shift system configured for allowing a transmission control unit (TCU) to be unified and used by unifying a mode and a time at which the shift signal is transmitted regardless of a type of shift operation device (a button, a dial, and a lever), to thereby reduce the investment cost and more easily establish a database of the shift signal.

According to an exemplary embodiment of the present invention, a method for transmitting a shift signal of an electronic shift system may include: transmitting the shift signal generated at the time of operating a shift operation device, wherein the shift operation device is configured so that one shift stage and one shift signal are matched one to one and transmits shift signals which are each individually separated according to the shift stage.

According to various exemplary embodiments of the present invention, a method for transmitting a shift signal of an electronic shift system may include: unifying a transmission of the shift signal generated at the time of operating a shift operation device, wherein the shift operation device may include all of a button type, a dial type, and a lever type; all of the button type, the dial type, and the lever type are configured so that one shift stage and one shift signal are matched one to one and transmit shift signals which are each individually separated according to the shift stage.

When the shift signals which are each individually separated according to the shift stage are transmitted, only a signal of a selected one shift stage may be transmitted, and signals of the remaining shifting stages which are not selected may not be transmitted.

When only any one shift signal among the shift signals which are individually separated according to the shift stage is transmitted within a predetermined time period, a transmission control unit (TCU) may accept one transmitted shift signal and perform a control so that a shift is performed.

When two or more shift signals among the shift signals which are individually separated according to the shift stage are simultaneously transmitted within a predetermined time period, a transmission control device may accept only one shift signal transmitted last and perform a control so that a shift is performed, and reject all of the remaining shift signals which are previously transmitted.

When only any one shift signal among the shift signals which are individually separated according to the shift stage is transmitted, a transmission control device may count a time from a point of time of transmission and stop the transmission of the shift signal after a predetermined time period elapses.

When another shift signal is transmitted after the transmission of the shift signal is stopped, the transmission control device may accept another following shift signal and perform a control so that the shift is performed.

When any one shift signal is transmitted by the operation of the shift operation device when a shift condition is not satisfied, the transmission of the shift signal may be forcibly stopped after the predetermined time period elapses, and when another following shift signal is transmitted within the predetermined time period after the transmission of the shift signal is stopped when the shift condition is satisfied, the transmission control device may accept another following shift signal and perform the control so that the shift is performed.

The shift operation device may include all of a button type, a dial type, and a lever type.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3, FIG. 4, and FIG. 5 are diagrams illustrating examples of a method for transmitting a shift signal of an electronic shift system according to an exemplary embodiment of the present invention.

Figure 1:
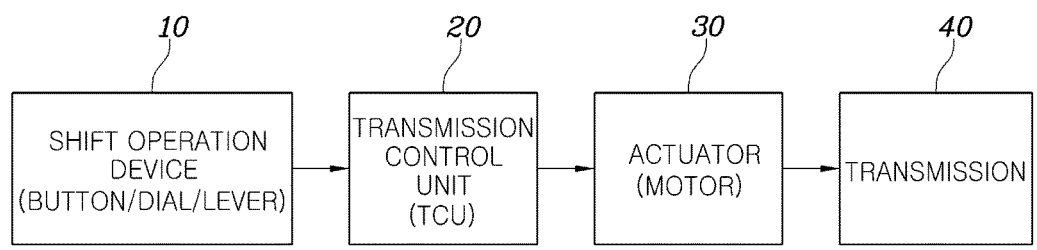
FIG. 1 is a related art which is applied to the present invention and a diagram schematically illustrating an electronic shift system.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, a method for transmitting a shift signal of an electronic shift system according to an exemplary embodiment of the present invention will be described with reference to the accompanying drawings.

A shift by wire (SBW) system, which is an electronic shift system for a vehicle, is a configuration without having a mechanical connection structure such as a cable between a shift operation device 10 and a transmission 40 as illustrated in FIG. 1, and is a system in which when a signal value generated at the time of operating the shift operation device 10 is transferred to a shift control unit (TCU) 20, an actuator 30 (a motor or a solenoid) is operated by an electronic signal instructed by the shift control device 20, and hydraulic pressure is applied to or cut from a hydraulic circuit for each of the shifting stages of the transmission 40 by the operation of the actuator 30, electrically performing a shift control.

Figure 2A:
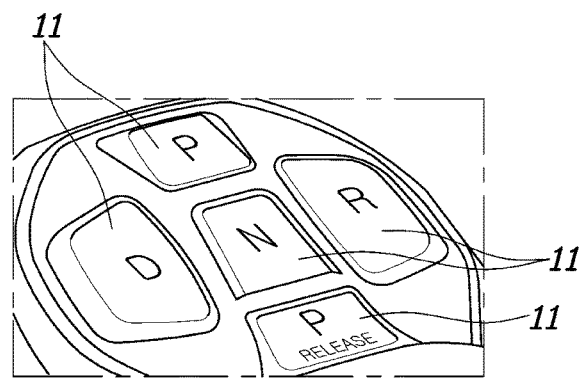
FIG. 2A, FIG. 2B, and FIG. 2C are diagrams each illustrating a type of shift by wire (SBW) used in the electronic shift system.
Figure 2B:
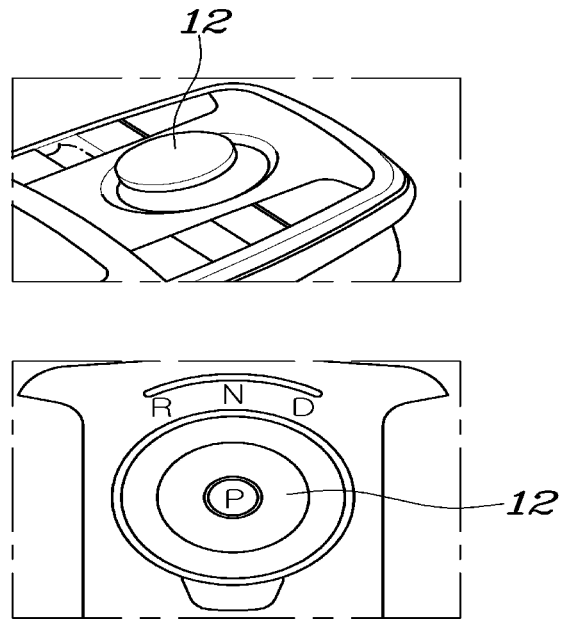
Figure 2C:
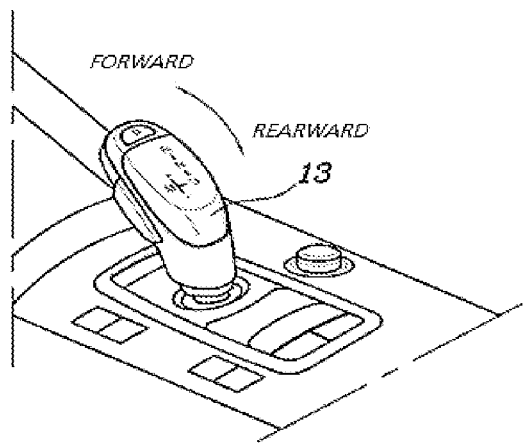

Examples of the shift operation device 10 forming the electronic shift system typically include a button type using a button 11, a dial type using a rotation of a dial 12, and a lever type using a lever 13 as each illustrated in FIGS. 2A, 2B and 2C.

According to an exemplary embodiment of the present invention, the transmission control unit 20 may be unified and used by unifying a mode and a time at which the shift signal is transmitted regardless of a type of the shift operation device 10 (the button, the dial, and the level) to thereby reduce the investment cost and more easily establish a database of the shift signal.

FIG. 3 illustrates various exemplary embodiments for unifying a mode of transmitting a shift signal.

A SBW of a button type is a configuration of transmitting shift signals individually separated for each of the shifting stages as the button 11 is separately provided to each of the shifting stages (P, R, N, D stages), and SBWs of a dial type and a lever type are configurations of transmitting the shift signal by use of one dial 12 or lever 13, to thereby transmit a continuously connected one shift signal.

As described above, in the conventional SBW, since the method for transmitting the shift signal is different depending on the button type, the dial type, and the lever type, the transmission control unit 20 receiving the shift signal has to be dualized and developed. As a result, the investment cost is increased and particularly, it is difficult to establish a database of the shift signal.

Therefore, in the various exemplary embodiments of the present invention, the SBWs of the dial type and the lever type are configured such that one shift stage and one shift signal are matched one to one like the button type, and are changed such that the shift signals separately separated depending on each of the shifting stages may be transmitted.

If the shift signals individually separated for each of the shifting stages as in an exemplary embodiment of the present invention are transmitted in the method of transmitting the continuously connected one shift signal like the SBWs of the conventional dial type and the lever type, the shift signals may be more stably transmitted for each of the shifting stages, reducing the possibility of malfunction.

Furthermore, in a case in which all SBWs of the button type, the dial type, and the lever type transmit the shift signals individually separated for each of the shifting stages, respectively, as in the various exemplary embodiments of the present invention, only a signal of one selected shift stage is transmitted and the signals of all the remaining shifting stages not selected are not transmitted, such that the shift signals may be more stably transmitted.

FIG. 4 illustrates various exemplary embodiments for unifying modes of transmitting a shift signal as another method.

The configuration of transmitting the shift signals individually separated for each of the shifting stages through the various exemplary embodiments is provided as a basic configuration, and in the instant case, if only any one shift signal is transmitted within a predetermined time period (defined as any one specific time of 10 ms to 50 ms), the transmission control unit 20 performs a control so that it accepts the transmitted one shift signal to perform a shift, and as a result, the shift to a desired shift stage is stably performed.

Furthermore, in a case in which two or more shift signals are simultaneously transmitted within a predetermined time period in the configuration of transmitting the shift signals individually separated for each of the shifting stages, the transmission control unit 20 performs a control so that it accepts only one shift signal which is transmitted last to perform the shift, and rejects all of the remaining shift signals which are previously transmitted.

In a case in which both the conventional SBW of the button type and the SBW of the dial or lever type simultaneously transmit two or more shift signals within a predetermined time period, the transmission control unit 20 has a configuration for accepting only one preceding shift signal transmitted first and rejecting all of the remaining shift signals transmitted after the preceding one, that is, accepting only a priority shift signal to perform the shift A driver rapidly operates the dial 12 or the lever 13 within a predetermined time period such that the SBW of the dial or lever type may be operated in the order of Nr, Nd, D, and Nd (Nr→Nd→D→Nd), and in the instant case, if the driver wants to change a final shift stage to a D stage, but only the preceding shift signal is accepted and all of the remaining shift signals transmitted after the preceding one are rejected, the shift to an N stage is finally performed, and as a result, there is a possibility that the conventional configuration does not perform the shift to the desired shift stage.

However, in the case in which the two or more shift signals are simultaneously transmitted as in the various exemplary embodiments of the present invention, if only one shift signal transmitted last is accepted and all of the remaining shift signals transmitted previously are rejected, the shift to a shift stage (D stage) that the driver desires may be performed. As a result, a shift operation may be more stably performed and particularly, it is possible to prevent an occurrence of an accident by a wrong shift.

FIG. 5 illustrates various exemplary embodiments for unifying a time of transmitting a shift signal.

The configuration of transmitting the shift signals individually separated for each of the shifting stages through the various exemplary embodiments is provided as a basic configuration, and in the instant case, if any one shift signal is transmitted, the transmission control unit 20 counts a time from a point of time of transmission of the shift signal and forcibly stops the transmission of the shift signal after the predetermined time period elapses, and if another shift signal is transmitted after the transmission of the shift signal is stopped, the transmission control unit 20 performs a control so that it accepts another following shift signal to perform the shift.

The SBW of the button type is a configuration in which when the SBW is operated by pushing the button 11, the shift signal is transmitted (ON), and when the button is not pushed, the transmission of the shift signal ends (OFF), and the SBW of the dial or lever type is a configuration in which it continues to transmit the same shaft signal until the shift to other shifting stages is requested due to the continuously connected shift signal.

That is, in the case of the SBW of the dial or lever type, if the shift signal is transmitted by an operation of the shift operation device 10 when a shift condition is not satisfied (a situation in which a brake pedal is not stepped), the shift is disabled by a decision logic of the control device, and the SBW continues to transmit the shift signal to be changed.

In the present situation, even if the driver continuously makes the situation in which the shift condition is satisfied (the situation in which the brake pedal is stepped) and re-operates the shift operation device 10, since the previously transmitted shift signal (the shift signal when the shift is disable) continues, if a new instruction (a rising trigger) is not provided, the transmission control unit 20 determines that there is no shift signal and continuously performs a control in a shift disable situation.

However, as in the various exemplary embodiments of the present invention, if the shift signal transmitted after a predetermined time period elapses after the point of time of the transmission of the shift signal is forcibly stopped, when the following shift signal is transmitted, the transmission control unit 20 accepts the following shift signal. As a result, the shift to the desired shift stage may be performed.

That is, if the shift signal is transmitted by the operation of the shift operation device 10 when the shift condition is not satisfied (the situation in which the brake pedal is not stepped), the shift is disabled by the decision logic of the control device and the shift signal transmitted after the predetermined time period elapses is forcibly stopped, and if the driver continuously makes the situation in which the shift condition is satisfied (the situation in which the brake pedal is stepped) and re-operates the shift operation device 10, the transmission control unit 20 accepts the following transmitted shift signal to thereby perform the shift to the desired shift stage.

As described above, according to the exemplary embodiment of the present invention, the transmission control unit 20 may be unified and used by unifying the mode and the time at which the shift signal is transmitted regardless of the type of the shift operation device 10 (the button, the dial, and the level) to thereby reduce the investment cost and more easily establish the database of the shift signal.

According to an exemplary embodiment of the present invention, as the unified shift signal may be transmitted regardless of a type of shift operation device (the button, the dial, and the lever), the TCU may be unified and used to thereby to reduce the investment cost and more easily establish the database of the shift signal.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for transmitting shift signals of an electronic shift system, the method comprising:

transmitting, by a shift operation device, a shift signal generated at a time of operating the shift operation device, to a transmission control unit (TCU), wherein the shift operation device is configured so that one shift stage and one shift signal among the shift signals are matched one to one and transmits the shift signals which are each individually separated according to shifting stages; and performing, by the TCU, a shifting of a transmission, according to the transmitted shift signal, wherein, when a shift signal among the shift signals which are individually separated according to the shifting stages is transmitted, the TCU counts a time from a point of time of transmitting the shift signal generated at the time of operating the shift operation device and stops the transmitting of the shift signal after a predetermined time period elapses, wherein, when a shift signal is transmitted by operation of the shift operation device when a shift condition is not satisfied, the transmitting of the shift signal is forcibly stopped after the predetermined time period elapses, and wherein when another shift signal is transmitted within the predetermined time period after the transmitting of the shift signal is stopped when the shift condition is satisfied, the TCU accepts the another shift signal and performs a control of the transmission according to the another shift signal.

2. The method of claim 1, wherein, when another shift signal is transmitted after the transmitting of the shift signal is stopped, the TCU accepts the another shift signal transmitted after the transmitting of the shift signal is stopped and performs a control of the transmission according to the another shift signal transmitted after the transmitting of the shift signal is stopped.

3. The method of claim 1, wherein the shift operation device includes one of a button type, a dial type, and a lever type.

4. A method for transmitting shift signals of an electronic shift system including a transmission control unit (TCU), the method comprising:

receiving, by the transmission control unit (TCU), the shift signals transmitted by a shift operation device, wherein the shift signals are generated and individually separated according to shifting stages by the shift operation device at a time of operation of the shift operation device which is configured so that one shift stage and one shift signal among the shift signals are matched one to one; and performing, by the TCU, a shifting of a transmission, according to the received shift signals, wherein, when a shift signal among the shift signals which are individually separated according to the shifting stages is received, the TCU counts a time from a point of time of transmitting the shift signal generated at the time of operating the shift operation device and stops the transmitting of the shift signal after a predetermined time period elapses, wherein, when a shift signal is transmitted by the operation of the shift operation device when a shift condition is not satisfied, the TCU is configured for forcibly stop the transmitting of the shift signal after the predetermined time period elapses, and wherein when the TCU receives another shift signal within the predetermined time period after the transmitting of the shift signal is stopped when the shift condition is satisfied, the TCU accepts the another shift signal and performs a control of the transmission according to the another shift signal.

5. A method for transmitting shift signals of an electronic shift system including a shift operation device, the method comprising:

transmitting, by the shift operation device, a shift signal generated at a time of operating the shift operation device, to a transmission control unit (TCU), wherein the shift operation device is configured so that one shift stage and one shift signal among the shift signals are matched one to one and is configured to transmit the shift signals which are each individually separated according to shifting stages; and stopping, by the shift operation device, the transmitting of the shift signal according to a control of the TCU after a predetermined time period determined by TCU's counting a time from a point of time of transmitting the shift signal generated at the time of operating the shift operation device when a shift signal among the shift signals which are individually separated according to the shifting stages is received by the TCU, wherein, when the shift operation device transmits a shift signal when a shift condition is not satisfied, the shift operation device is configured to stop transmitting of the shift signal according to a control of the TCU after the predetermined time period elapses, and wherein the shift operation device transmits another shift signal within the predetermined time period after stopping the transmitting of the shift signal when the shift condition is satisfied, so that the TCU accepts the another shift signal and performs a control of a transmission according to the another shift signal.

* * * * *